United States Patent [19]
Decker et al.

[11] Patent Number: 5,279,632
[45] Date of Patent: Jan. 18, 1994

[54] PLANAR CLEAN ROOM CEILING STRUCTURE

[75] Inventors: Donald W. Decker, Millbrook; Edward L. Pepe, Middletown, both of N.Y.

[73] Assignee: International Business Machines Corporation, Armonk, N.Y.

[21] Appl. No.: 992,184

[22] Filed: Dec. 17, 1992

[51] Int. Cl.⁵ .............................. B01D 46/10
[52] U.S. Cl. ...................... 55/355; 52/484; 55/385.2; 55/484
[58] Field of Search ............ 55/355, 385.2, 484, 55/495, 500, 508; 52/484

[56] References Cited

U.S. PATENT DOCUMENTS

| | | |
|---|---|---|
| 3,685,235 | 8/1972 | Lang . |
| 3,743,826 | 7/1973 | Halfaker . |
| 3,848,385 | 11/1974 | Thompson . |
| 4,041,668 | 8/1977 | Jahn et al. . |
| 4,088,463 | 5/1978 | Smith ............... 55/385.2 X |
| 4,683,699 | 8/1987 | Larsson . |
| 4,710,208 | 12/1987 | Ziemer et al. ........ 55/355 |
| 4,765,102 | 8/1988 | Kuchem . |
| 4,769,958 | 9/1988 | Limp . |
| 4,846,859 | 7/1989 | Nobiraki et al. . |
| 4,883,511 | 11/1989 | Gustin et al. ........ 55/355 |
| 4,883,515 | 11/1989 | Monson et al. . |
| 4,946,484 | 8/1990 | Monson et al. . |
| 4,976,757 | 12/1990 | Helmus ............... 55/355 |
| 4,986,050 | 1/1991 | Brunetti et al. ....... 55/355 X |

*Primary Examiner*—Charles Hart
*Attorney, Agent, or Firm*—Whitham & Marhoefer

[57] ABSTRACT

A plenum-type ceiling for a clean room is formed of modules having lateral side portions which are adapted to be attached together into a grid-like network. Bottom portions of the lateral sides of each module are inwardly stepped to provide downwardly facing recessed channels for the installation of lighting, fire extinguishing equipment and other facilities so that the ceiling is substantially planar and without facilities or lighting protruding therefrom. Inwardly and outwardly facing channels are also provided at the lower edge of the inwardly stepped portions of the sides in order to form an annular trough as a seal structure for mounting of air filters and air flow control devices. A bracket is also provided for suspension of objects such as partitions from outwardly facing channels in a manner which substantially eliminates entrainment of air near the ceiling and the avoidance of interference with the facilities. The recessed location of the facilities provides improved distribution thereof while avoiding interference with the air flow pattern as well as mechanically protecting the facilities.

22 Claims, 7 Drawing Sheets

PLANAR CLEAN ROOM CEILING STRUCTURE

BACKGROUND OF THE INVENTION

1. Field of the Invention

The present invention generally relates to ceiling structures and, more particularly, to planar ceiling structures including air filtration systems for clean rooms as well as other facilities such as lighting systems, fire extinguishing systems and electrical distribution systems.

2. Description of the Prior Art

Many products such as high-precision machines and electronic components are highly sensitive to contamination from particulate materials often found in the ambient atmosphere. Once manufactured, these products can usually be sealed or protection from contamination otherwise provided. However, during the course of manufacture of these types of products, no such protection can be provided for the products themselves and reliance is placed upon the provision of an environment, commonly referred to as a "clean room" from which contaminants and sources of contaminant material are rigorously excluded.

Such clean rooms generally rely on continual filtering of the air for the removal of any contaminant material which may be present or introduced. In this regard, contaminants may actually be produced in clean rooms during manufacturing processes involving the working or removal of materials from workpieces or condensing or coalescing from vapors. Therefore it is imperative that all air within the clean room be continually circulated and filtered. It is similarly important that contaminants, when produced, be quickly transported to locations where they can be captured and thus restrained from circulating to other areas of the clean room. For this purpose, air is usually circulated through the clean room from the ceiling to the floor, often provided as a raised grid structure, and then returned through ducts to the ceiling. This provides circulation across the shortest dimension of the room and effectively confines contaminants to the area where they are produced. Also, since contaminants are typically more dense than the atmosphere, the rapid transportation of contaminants is enhanced by gravity. The air is filtered at its exit from the ceiling. Distribution of air should also be over as much of the ceiling area as possible to prevent the entraining of air or other anomalies in the ceiling to floor circulation pattern.

However, it is generally necessary to also provide other services such as light and electricity, compressed air, fire extinguishing systems and the like in the clean room in addition to highly filtered air, in order to provide for worker safety and to support the manufacturing process being carried out. These services are collectively referred to as "facilities". The provision of these facilities often can compromise the clean room environment since they usually require penetration of the walls, ceilings and/or floors of the clean room. Also, the materials involved, such as electrical insulation, as well as material of the structural room itself (e.g. the portion of the building structure in which the clean room is constructed) where facilities enter the clean room, can be sources of contaminant material. Further, in large spaces, provision of facilities is most conveniently done at the ceiling. Since any discontinuity, such as holes, in the filters is undesirable, areas of the ceiling must be effectively dedicated to the facilities and are therefore unavailable for maintaining the ceiling to floor air circulation pattern. The provision of lighting is particularly difficult in this regard since lighting must also be evenly distributed in most installations and generally must form part of the ceiling structure to achieve this distribution.

Similarly, it is not desirable to suspend any structure having a significant horizontal area below the ceiling of a clean room since such areas disrupt the desired air flow pattern and may also allow particulate materials to collect. Then, some slight mechanical disturbance may cause collected materials to be dispersed in a relatively large quantity which could contaminate significant areas of the clean room and products being manufactured before trapping can occur. Lighting also presents a further complication in this regard since suspended lighting, especially lighting containing fluorescent tubes, could be mechanically damaged and thus become a further source of contaminants. Additionally, any facilities which are suspended below the ceiling or present a significant area below the ceiling level will interfere with the distribution of light throughout the area.

Another complication is the provision of partitions for forming so-called mini-environments within the clean room. Mini-environments are often necessary either to more fully exclude or contain contaminants for particular areas of the clean room. Different air flow rate is often provided in these mini-environments than is provided for the remainder of the clean room. These mini-environments are provided by partitions which must generally be attached to the ceiling and suspended therefrom for structural reasons. To avoid presenting a significant horizontal area, relatively thin sheets of material are generally preferred. Suspension close to the ceiling is necessary to avoid entraining of contaminated air near the ceiling. However, since the location for such suspension may not be provided in the areas covered by filters, suspension must be made from the same areas dedicated to facilities. In particular, since lighting and lighting fixtures occupy a large portion of this area, partitions interfere with the distribution of light from the fixtures wherever the partitions are located. In short, all of the facilities interfere with each other and the function of the air circulation and filtration system.

It is also known that the highest air quality in clean rooms is provided by systems which employ plenums for the distribution of air. These plenums are preferably constructed from plenum modules which may be generally regarded as box-like structures have a cross-section in the form of an inverted "U" so that the bottoms are opened to receive filter materials and other air flow regulation devices, such as dampers. Plenum modules may be bolted together end-to-end to form one or more plenums or ducts which extend over the area of the clean room. The sides of the plenum modules may also have openings for receiving filters or communicating air between plenum modules.

The plenums or ducts thus formed of plenum modules form the basic structural members of the air distribution system for the clean room and support the filters elements (and any grille-work which may be included as well as the dampers and other air flow control devices). At the same time the plenums provide for containment of the recirculated air within a surface, such as a baked polyurethane coating on at least the interior of the plenum modules, which does not shed contaminants. Therefore, it is undesirable to modify the plenums or plenum modules in any way, such as by drilling, to route facilities therethrough. Dedicated areas used for access to facilities (where plenum modules are omitted) disrupts the desired air flow pattern, discussed above. Further, omission of plenum modules to produce such dedicated areas reduces the structural integrity of the plenum assembly. The alternative would require modification of plenum modules which compromises the air delivery and filtration performance of the plenum system and may also affect the structural integrity thereof.

Additionally, plenums and plenum modules known in the art do not generally provide structures suitable for forming mini-environments, without modification and do not provide for convenient changes of mini-environments. As indicated above, partitions may only be attached to the ceiling at locations not occupied by the air filtration system. Thus, concentration of facilities in dedicated areas limits the locations at which attachment of partitions to the ceiling may be made. At the same time, the concentration of facilities reduces the regularity of lighting distribution and the limitation of attachment locations for partitions virtually assures interference of the partitions with either the facilities, including lighting distribution, or the air circulation and filtration or both.

Further, since mini-environments are generally formed in order to segregate areas in which differentiated air flow will be used, entrainment of contaminated air often occurs near the ceiling due to the differential air flow rates when the partition locations do not accurately follow the boundaries of the differentiated air flow areas. Particularly since air flow distribution will be disrupted where facilities are concentrated, it is virtually guaranteed that entrainment of contaminated air will occur and will be aggravated by the suspension of partitions from those areas. Support of partitions only from the floor does not provide a solution since the upper edges will then be unstable in a lateral direction and their locations uncertain. Further, a regular clearance from the ceiling and the air inlets may also increase entrainment of contaminated air.

SUMMARY OF THE INVENTION

It is therefore an object of the present invention to provide a modular plenum-type air distribution structure for clean rooms which also provides for distribution of facilities.

It is another object of the present invention to provide a modular plenum construction system in which interference between air flow pattern, facilities and mini-environment partitions is inherently very limited or effectively avoided.

It is a further object of the invention to provide a ceiling construction system which has a substantially planar lower surface and from which no structures required by facilities protrude therefrom and which is potentially homogeneous in the provision of facilities and locations at which structural connections, such as for the suspension of partition, can be made.

It is yet another object of the invention to provide a structure for the suspension of mini-environment petitions which inherently minimizes interference with both air circulation patterns and the distribution of facilities such as lighting and fire extinguishment structures.

In order to accomplish these and other objects of the invention, a plenum module is provided having at least one lateral surface having an inwardly stepped portion at a lower edge thereof and a channel member located at the inwardly stepped portion and forming at least one upwardly open channels on an inward facing side of the inwardly stepped portion of the lateral surface.

In accordance with another aspect of the invention, a ceiling system is provided including at least four modules, each said module including at least one lateral surface having an inwardly stepped portion at a lower edge thereof and an arrangement for attachment of a lateral surface thereof to a lateral surface of an adjacent module, and a channel member located at the inwardly stepped portion and forming at least one upwardly open channels on an inward facing side of the inwardly stepped portion of the lateral surface, the four modules, when joined together by the attachment means forming a grid wherein the inwardly stepped portions of adjacent modules form downwardly facing channels.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
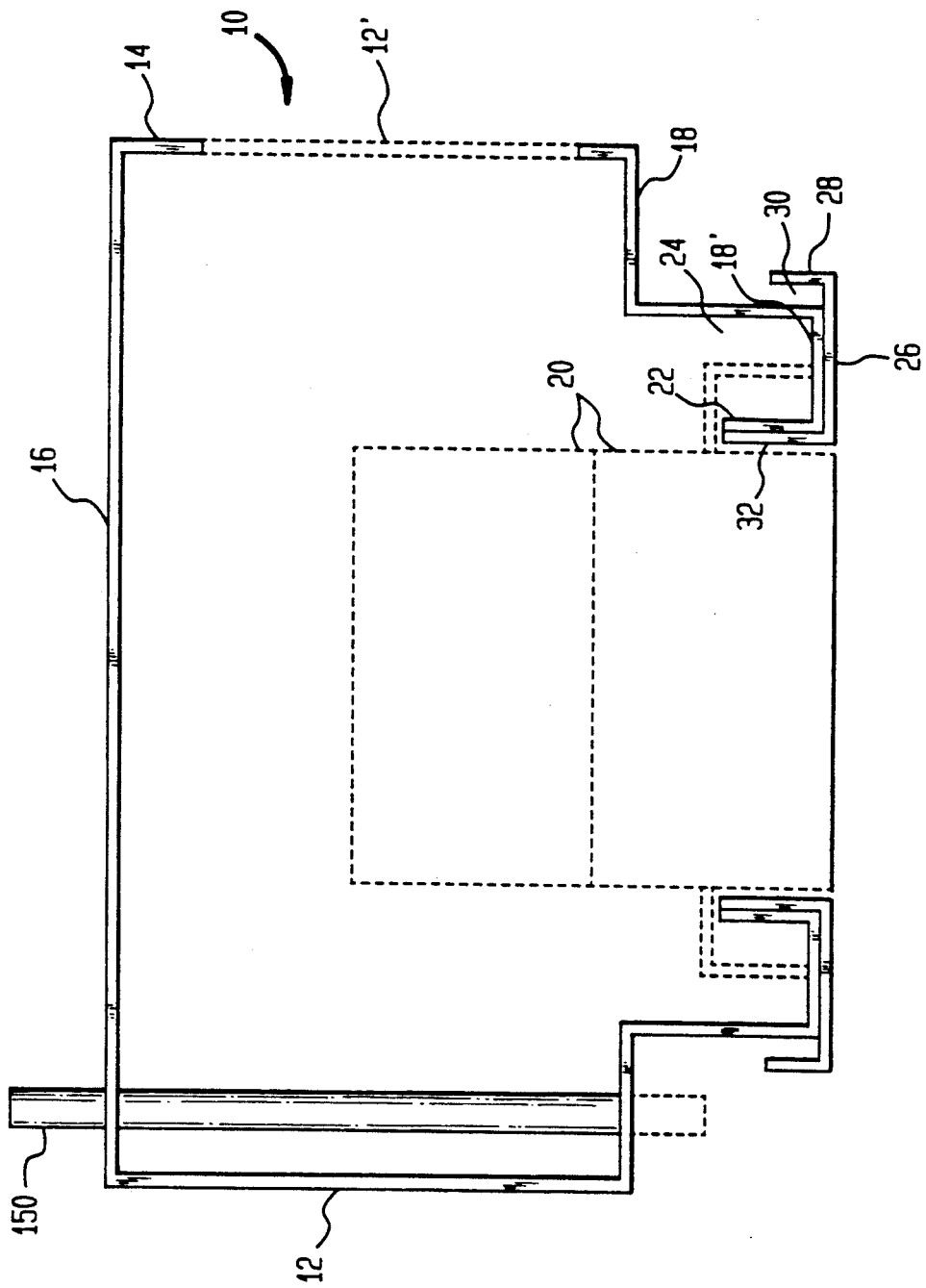
FIG. 1 is a cross-sectional view of a plenum module in accordance with the invention.

Referring now to the drawings, and more particularly to FIG. 1, there is shown a cross-sectional view of a plenum module 10 in accordance with the invention. The plenum module has the overall form of an inverted "U" which is open downwardly to allow air control structures, generally indicated by dashed line 20 to be inserted within the plenum module and flush with the open lower surface thereof. The plenum modules are preferably fabricated of sheet steel which is coated with a stable and non-shedding surface coating such as baked polyurethane. The sides 12 of the plenum modules may be open or closed but it is preferable, if the sides 12 are to be open, that a relatively wide flange 14 frame the opening (depicted by dashed lines 12') to provide structural strength and to allow an area for bolt holes in standardized positions for permitting a plurality of modules to be bolted together both end-to-end and in a lateral direction to form a grid of boxes of high structural strength and rigidity. This grid structure derives high strength and rigidity by essentially forming a plurality of adjacent "box beams" extending in angularly disposed (e.g. orthogonal) directions across the entirety or desired portion of the ceiling area. Holes or brackets (not shown) may also be provided in or on an upper surface 16 for hardware to attach (e.g. suspend) the plenum modules periodically to the structural ceiling of the structural room in which the clean room is constructed. It is desirable that all of these holes, if provided, be formed prior to the application of the surface coating so that the material of the plenum module will be fully sealed and protected.

In accordance with the invention, the lower ends of the plenum module sides are stepped inwardly through two steps 18, 18' the latter inward step preferably including an upwardly turned flange 22 to form an upwardly facing channel 24. Over this upwardly facing channel 24, an upwardly open "U"-shaped channel member 26 is attached, preferably by welding. Channel member 26 serves to reinforce the lower edge of the plenum module 10 and is preferably wider than the outside dimensions of channel 24 in order to form an additional channel 30 by means of upwardly turned flange 28. Channel member 26 is preferably formed of the same type of sheet metal material as the remainder of the plenum module 10 but could be formed by extruded or rolled structural shape stock. Upwardly turned flange 32 is preferably longer than flange 22 by the thickness of the sheet material of the plenum module so that the upper ends of both flanges will be flush with each other. The width of channel member 26 is preferably only slightly wider than the outside dimensions of channel 24 and flange 28 substantially shorter than flange 32 so that channel 24 will be relatively wide and deep while channel 30 will be relatively narrow and shallow. These relative dimensions are chosen to accommodate structures which the respective channels are to support and the properties of the mechanical joint to be formed thereby. Specifically, channel 24 must form an air-tight joint with supported structure since it is located on the interior of the plenum module whereas channel 30, being on the exterior of the plenum module need not.

Plenum modules 10 also preferably include one or more conduits as shown, for example, at 150 which are preferably inserted through holes in the plenum module and the holes closed around the conduits 150 by welding. The length of protrusion into channel 120 (FIG. 2) indicated by dashed lines, is preferably provided only for conduits to which sprinkler heads are to be attached. It is contemplated for installation that the plenum modules are sufficiently rigid to form a floor of a facilities chase of sufficient height to allow maintenance personnel to service the facilities above the ceiling structure in accordance with the invention. The ceiling structure in accordance with the invention thus provides an air-tight barrier between the clean room below and the facilities chase above in the structure surrounding the clean room. Each individual plenum module may thus have facilities provided thereto as may be necessary.

Figure 2:
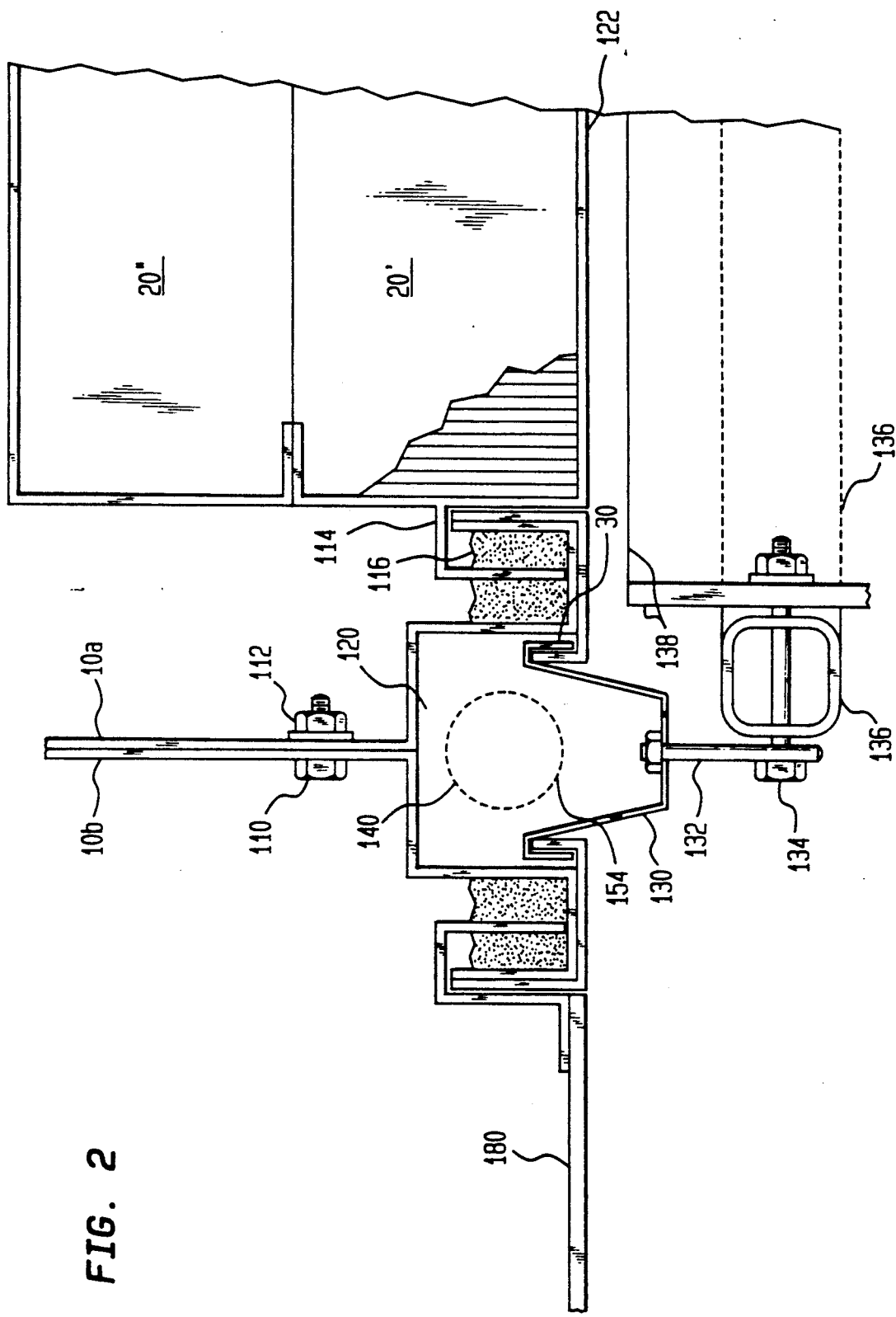
FIG. 2 is a cross-section of a lateral connection of two plenum modules of a plenum structure in accordance with the invention.

Referring now to FIG. 2, the assembly of two plenum modules in a lateral or end-to-end direction will be described. For clarity, only portions of sides 12 (FIG. 1) are shown for two laterally adjacent plenum modules, respectively designated 10a and 10b. The end-to-end joint will preferably appear substantially the same; the two connections being differentiated by the fact that the plenum modules are preferably rectangular with a length to width ratio of about 2-3:1. However, the dimensions of the module are relatively unimportant to the practice of the invention. These modules are preferably bolted to each other as indicated by bolt 110 and nut 112. A plurality of such modules form a network comprising one or more plenums extending in a grid-like fashion over as much of the ceiling area as possible. A washer is preferably used to avoid damage to the coating material on the sheet material of the plenum module.

When plenum modules 10a and 10b are thus attached together, the first inward step 18 (FIG. 1) of the lower edge of each of the adjacent plenum modules forms a downwardly facing channel 120 which is recessed above the plane of the ceiling surface 122. In the assembly of a plurality of plenums in a grid, as noted above, these channels 120 also form a grid-like array of channels extending periodically over the entirety of the area covered by the plenum modules. Thus, while facilities are preferably provided individually to the plenum modules, it is possible to also run facilities within the recessed channels 120, although this is not preferred. To avoid the existence of surfaces where contaminants could collect facilities such as sprinkler 152 is individually provided to the plenum module by conduit 150 and brought to the plane 122 of the ceiling as desired or necessary, as shown, for example at pipe 152 and nozzle 154 of the sprinkler system. Similarly lighting is provided in a recessed manner, preferably with fluorescent tubes, indicated at 140. It is preferable for simplicity of construction and maintenance of the structure that lighting fixtures not extend across joints between plenum modules. Electrical distribution devices may also be included in the channel and wiring routed thereto through conduits such as that shown at 150 (which are also sealed).

Figure 3:
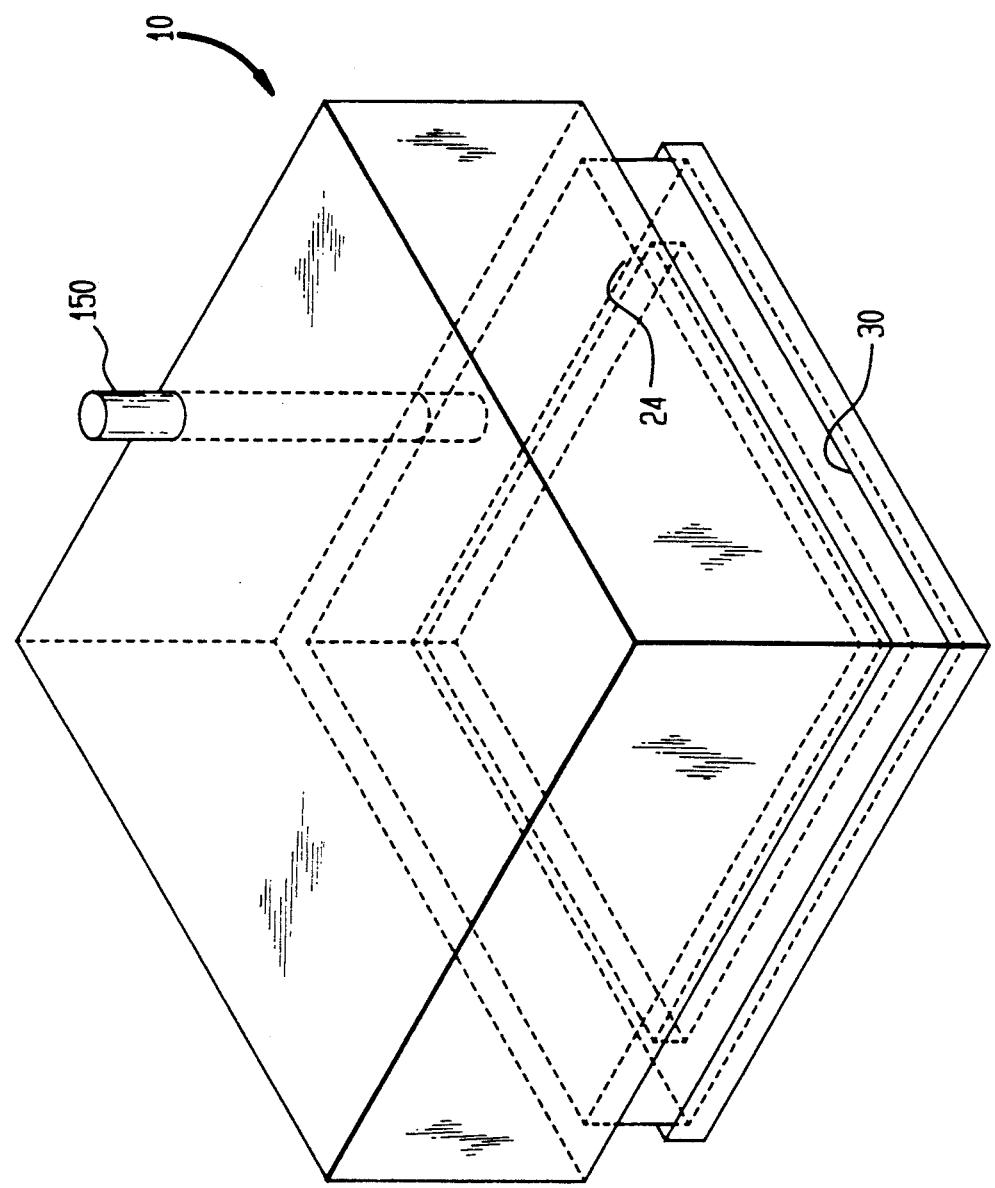
FIG. 3 is an isometric view of a plenum module.

It should be noted that the channel members 26 are thus suspended by webs formed by the sides 12 of plenum modules (e.g. 10a, 10b) and are of substantial structural rigidity and strength, particularly due to the doubling of material at flanges 22, 30 and over the bottom of channel 24. Therefore, this structural network is capable of supporting the substantial weight of air control structures 20, shown more particularly in FIG. 2 as a filter 20' (preferably an HEPA filter with a face guard) and a damper 20" (e.g. adjustable louvers) for regulation of air flow volume. Both of these elements are preferably supported on flanges 114 which are preferably dimensioned to bring the filter face guard flush with the plane of the ceiling 122. An air-tight seal is formed about the flanges with a gel seal which is contained within the channels 24 and can flow in a viscous manner to maintain a reliable seal. Incidentally, as shown in the isometric view of FIG. 3, at least channel 24 is continuous around the inner periphery of plenum module 10 to form an annular cup or trough in the shape of a rectangle (or other closed polygon) in order to contain the gel seal material. Where desired, steel blank-off panels 180 may be installed in the same manner.

In view of the foregoing, it is seen that the configuration of the plenum modules provides for a planar ceiling containing air filtration and control structures in which a network for distribution of facilities is recessed above the plane 122 of the ceiling and thus does not interfere with the air distribution or form horizontal surfaces where contaminant particles can be collected under influence of the air flow pattern. Further, by recessing the facilities above the plane of the ceiling 122, substantial protection from mechanical damage is provided for the facilities. While these features represent a significant improvement over plenum-type ceiling structures known in the art, the increased structural strength provided by the channel members 26 as well as the box beam grid allows for the support of other structures by the ceiling structure in accordance with the invention.

Figure 4:
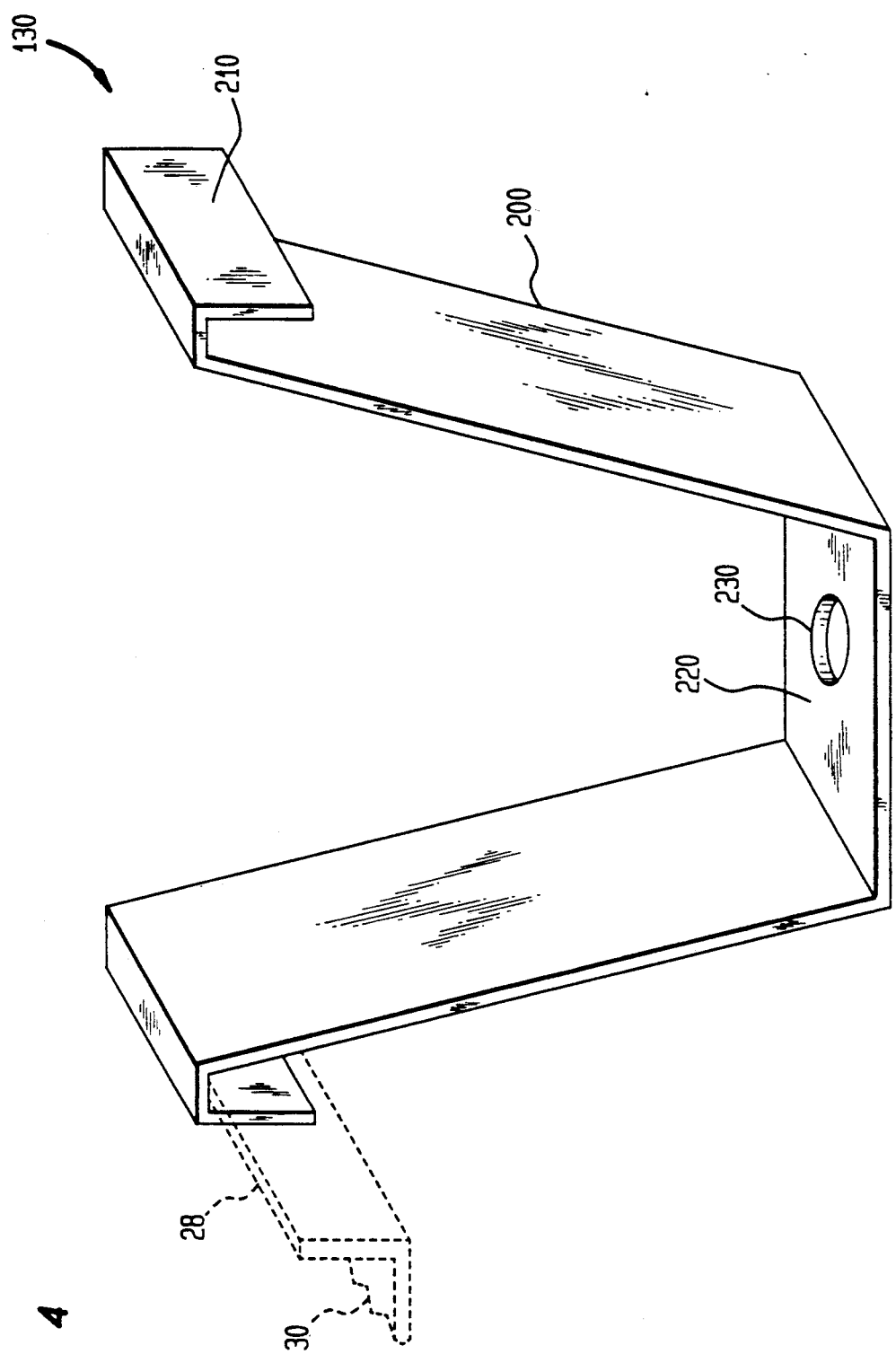
FIG. 4 is an isometric view of bracket 130 of FIG. 2.

Specifically, and with further reference to FIG. 2, mini-environment structures may be suspended from channels 30 by means of brackets 130 which can be placed in any desired location along flanges 28. Brackets 130 are preferably formed of a substantially rigid strap 200, preferably of stainless steel, as shown in the isometric view of FIG. 4. The overall shape is that of a "V" with a flattened bottom 220 to accommodate hardware such as a stainless steel eye bolt 132 (FIG. 2) through aperture 230. The ends of strap 200 include hook portions 210 for engaging channels 30 and flange 28, shown in phantom in FIG. 4.

The preferred form of a mini-environment structure to be suspended from brackets 130 is shown in FIG. 2. The periphery of the mini-environment is preferably defined by a frame 136, preferably formed by rectangular tubing of anodized aluminum. Surface treatment by anodizing prevents oxidizing of the aluminum surface and avoids the frame becoming a source of contaminant particles by shedding. While aluminum is preferred for its light weight, other materials such as stainless steel could also be used. Some materials may require surface treatments such as baked polyurethane coatings to stabilize the surfaces. Partition sheets 138 are preferably formed of sheets of polycarbonate material of approximately ¼" thickness although the material and the thickness thereof are substantially irrelevant to the practice of the invention as long as the material does not form a source of contaminant particles.

The mini-environment is preferably constructed before attachment to the ceiling structure by through bolting of the polycarbonate panels 138 to frame 136 with bolts 134. Bolts 134 also secure stainless steel eye bolts 132 which will be used to suspend the partitions of the mini-environment from brackets 130. The brackets 130 may then be attached to the eye bolts 132 and the mini-environment partitions suspended from the ceiling structure by engaging hook portions 210 with flanges 28 of channels 30.

It should be noted that the assembly of the partition 138, frame 136 and eye bolt 132 provides an offset of the partition around the periphery of the mini-environment which is substantially equal to the horizontal dimension of step 18 (FIG. 1). This positioning is principally the function of the width of frame member 136 although this offset could be provided in other ways. The frame member is also offset from the center of the channel and shadows therefrom will fall entirely on the partition and thus will not interfere with lighting elsewhere in the room. The frame 136 can also be provided either internally or externally to the mini-environment and partition dimensions can remain standardized, depending on whether the facilities are to be provided to the interior or the exterior of the mini-environment. The partitions thus follow only the grid between air filters and dampers and thus are located where air flow rate may be differentiated. Suspension provides for the maintaining of a regular small gap at the top (similar to the height of flange 22, 32 for ease of installation of bracket 130). This location virtually eliminates the entrainment of contaminated air near the ceiling.

Therefore, it is seen that the plenum module in accordance with the invention provides a single type of module which may be bolted together laterally to form an air-tight barrier of high structural strength and rigidity between a clean room environment and a facilities distribution chase. Facilities such as sprinklers, electrical distribution hardware and lighting are provided in a recessed channel which does not interfere with each other or a preferred air flow pattern for the clean room. The modular plenum structure is also capable of supporting air filters and air control dampers as well as partitions forming mini-environments which can be readily moved and changed and which do not interfere with the provision of facilities and lighting, in particular. The location of mini-environment partitions also virtually eliminates the entrainment of contaminated air near the clean room ceiling.

Figure 5:
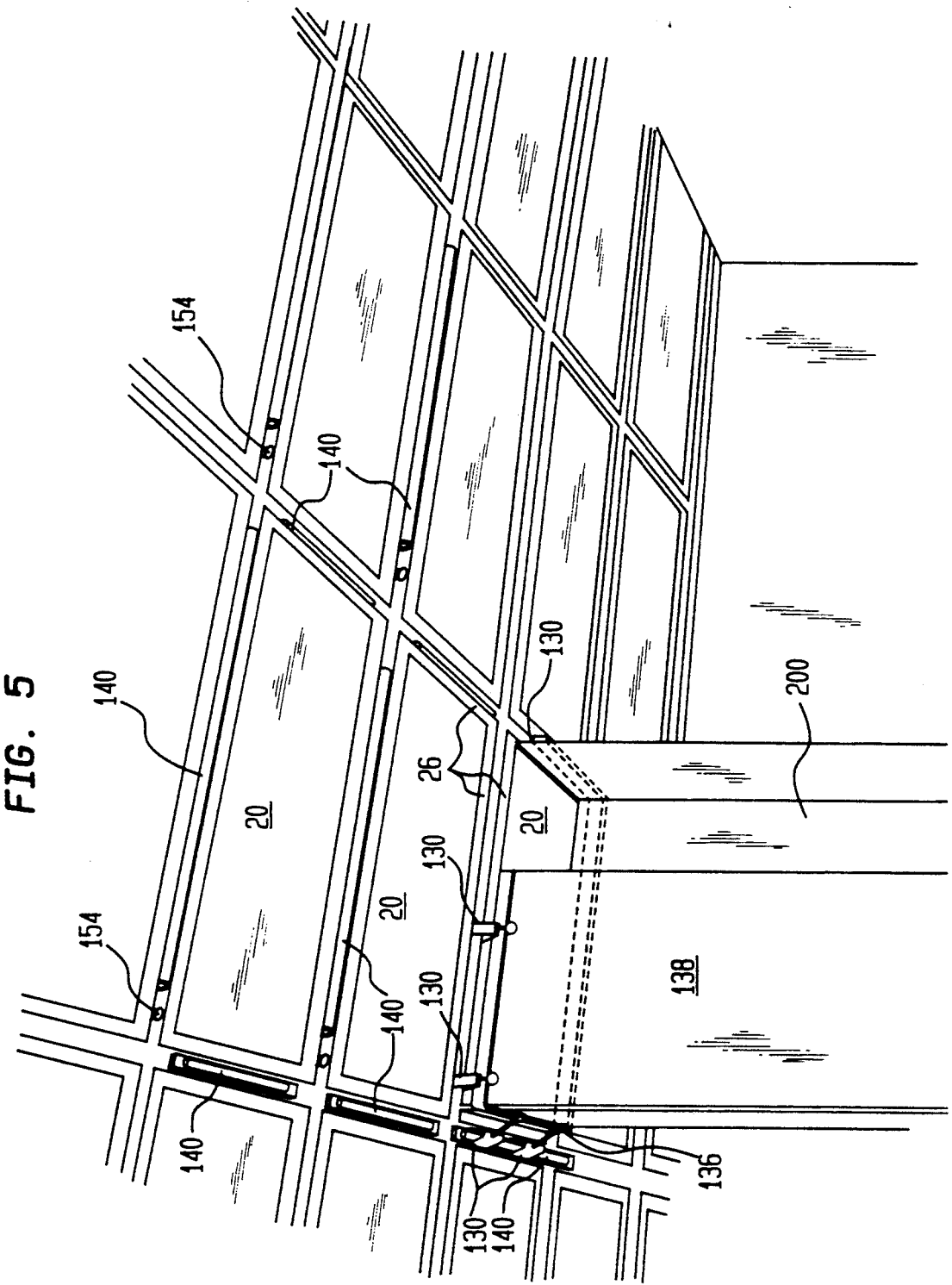
FIG. 5 is a perspective view of the lower surface of a ceiling structure constructed in accordance with the invention.

In summary, as can be seen from the perspective view of FIG. 5, the completed ceiling, assembled from plenum modules, in accordance with the invention, provides a substantially planar ceiling structure in which substantially the entire area may be tiled with filters and other air flow control structures 20 and in which all utilities such as lighting fixtures 140 and sprinkler system 154 are recessed in downwardly facing channels therein. The channels extend in a grid pattern over the area of the ceiling and the facilities may thus be similarly evenly distributed. Since facilities are separately mounted adjacently in the channels, they do not interfere with each other or the air flow pattern. Similarly, a grid pattern of channel members 26 surrounds each air filter 20 (or blank-off panel 180) and are available throughout the grid pattern for suspension of objects such as partitions 138 by brackets 130 at locations which are coincident with locations at which the air flow rate may be altered, thus substantially preventing the entrainment of contaminated air. By the same token, the offset mounting locations provided by the combination of brackets 130 and frame 136 avoids interference with either the air flow pattern or the distribution of facilities such as lighting or fire extinguishing sprinkler systems 154 by partitions 138, forming mini-environments 200. Even brackets 130 do not significantly interfere with lighting since they can generally be placed near the corners of modules and not across the lighting fixtures. However, even when brackets are placed across lighting fixtures, they extend perpendicular to the length of the preferred fluorescent fixtures (and are of relatively narrow width) and thus do not cast any significant shadows into the work area of the clean room.

Figure 6:
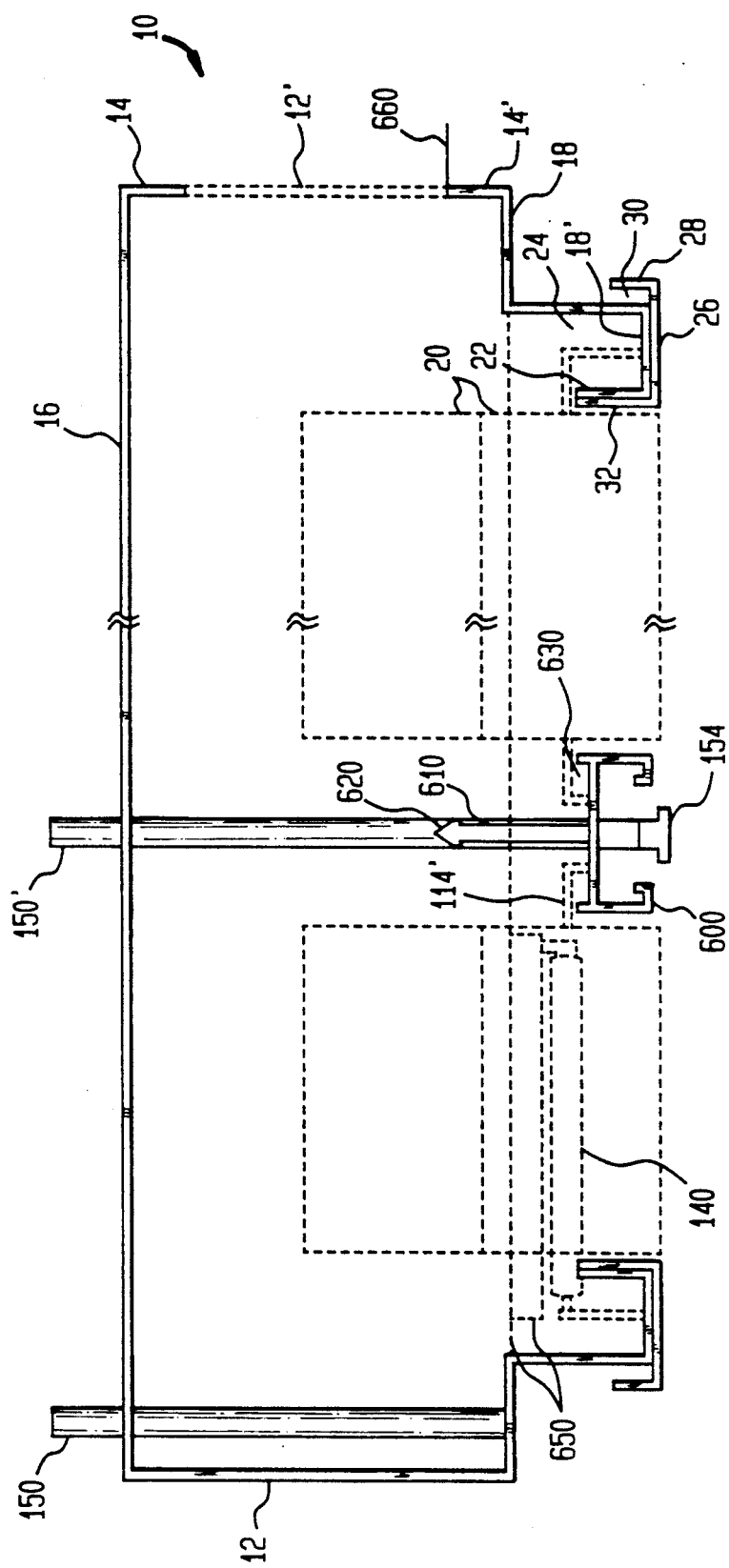
FIG. 6 is a cross-sectional view, corresponding to that of FIG. 1, of a preferred form of the plenum module in accordance with the invention.

Having explained the principles of the invention above, a preferred embodiment of the invention will now be discussed in connection with FIG. 6. FIG. 6 is a cross-sectional view of a single plenum module similar to the view in FIG. 1 and all reference numerals applied to FIG. 1 have been included in FIG. 6. The formation of the lateral sides of the module are identical to that discussed above and attachment of adjacent modules is also the same as that shown in FIG. 2. Therefore, discussion of these features will not be repeated here.

The preferred form of the plenum module differs from that described above principally in size with regard to filters and dampers 20 and the manner in which conduits 150, forming part of the sprinkler system are arranged. Initially, while not specifically shown in FIG. 6, the preferred commercially available filter modules are rectangular, as shown in FIG. 5. It has also been found that, as a matter of the amount of labor involved in installation and material required for fabrication of the plenum modules, significant economies can be realized without compromising the strength and performance of the assembled structure if plenum modules are fabricated of a size to support a plurality of filters a four-by-four grid array has been found particularly convenient and advantageous in this regard.

To support the filter modules and also allow for recessing of lighting and sprinklers across this larger module, a further grid is formed in the open lower side of each module with a network of further channel members 600. These further channel members 600 are preferably unitary and formed as metal extrusions, generally in the form of an "H" with an upstanding web 610 formed centrally of the horizontal segment thereof. The upstanding web provides for strengthening and possibly for suspension from the upper surface 16 of the module (or other structure if the invention is embodied with grid modules corresponding to the lower portion only of plenum modules in a non-plenum system) by means of enlarged upper edge 620. The upward extending legs of channel member 600 form upwardly open channels 630 which preferably contain gel seal material for forming a seal with flanges 114' of the filter modules 20.

It should be noted that in the embodiment of the invention shown in FIG. 5, sprinkler heads 154 of a fire extinguishment system are mounted off-center in the channel and at the ends of the lighting fixtures. The off-center positioning not optimum for sprinkler distribution even when the sprinkler heads are made to protrude slightly from the ceiling but is effectively forced by the formation of the channels at the lateral sides of the smaller plenum modules of FIG. 1. Also, the proximity of electrical fixtures to a source of water or liquid fire-extinguishing chemicals may not be desirable. Additionally, the coverage area of a single sprinkler head is substantially greater than the area of a single filter module and the placement frequency of sprinkler heads shown in FIG. 5 may be excessive. The frequency of light fixture placement also yields a level of illumination greater than may be required. In the preferred embodiment, the use of channel members 600 allows for sprinkler heads 154 to be located centrally in a channel and also centrally between intersections of grid channels 600 and only along one coordinate direction of the grid. To provide separation between the sprinkler heads 154 and lighting fixtures 140, lighting fixtures are preferably located in recessed channels 120 only in the other coordinate direction of the grid (shown by dashed lines 640 of FIG. 6). This patterning of sprinkler head placement also allows the use of lighting fixtures using greater lengths of fluorescent tubing. Thus in the preferred form of the invention having a plenum module subdivided by a four-by-four grid pattern, two conduits 150, are provided for the sprinkler system and six or eight conduits 150 are provided for electrical connection to wiring in each plenum module.

As briefly alluded to above, while an embodiment of the invention employing plenum modules is much preferred for clean room applications, the invention can also be carried out in a non-plenum ceiling system. The same advantages of mutually non-interference between air flow pattern, facilities and mini-environment partitions continue to be achieved even when the structure is limited to that shown below line 660 in FIG. 6, leaving flange 14' for assembly of the grid modules.

Figure 7:
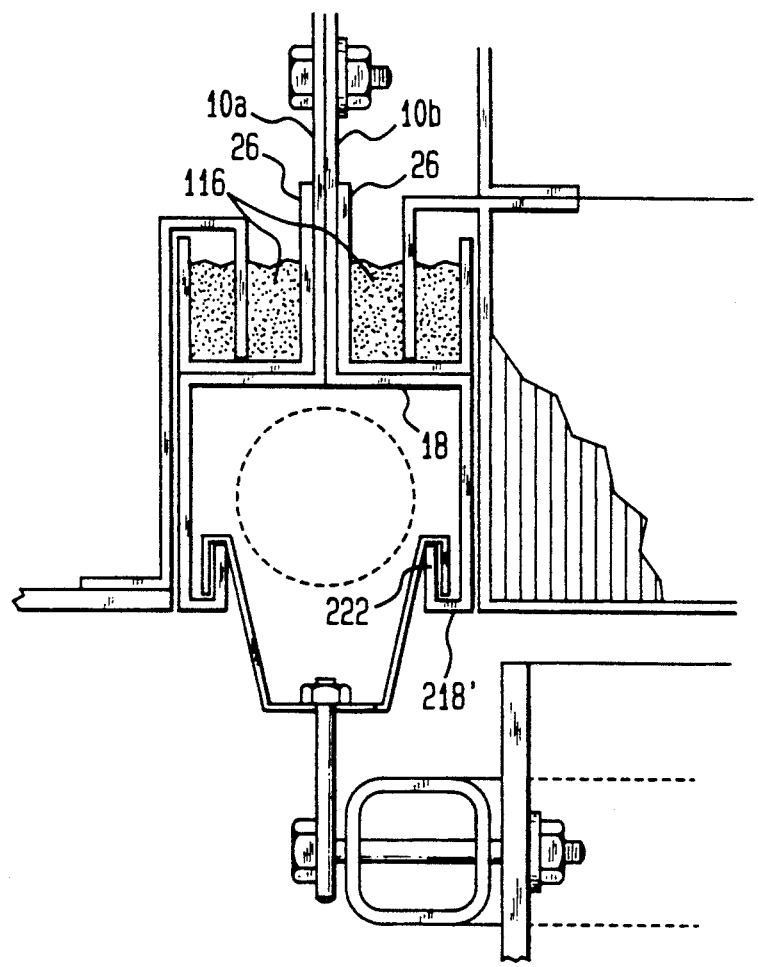
FIG. 7 is a cross-sectional view of an alternative construction of the invention.

As will also be understood by those skilled in the art in view of the foregoing disclosure, alternative constructions of the invention are clearly possible within the spirit and scope of the invention. A particularly preferred construction is shown in FIG. 7 in a cross-sectional view similar to that of FIG. 2. Therefore, corresponding reference numerals of FIGS. 1 and 2 will also be used in FIG. 7, insofar as possible and incremented by 200 otherwise.

FIG. 7 differs from the embodiment of FIG. 2 principally in the shape and location of channel member 26. Also the inwardly stepped portion 18 of the side 12 of the module (e.g. plenum module or grid module) is turned outward rather than inward at 218' and 222. Channel member 26 is located at the upper rather than lower edge of the inwardly stepped portion 18 and forms an upwardly open channel on the inward facing sides thereof to contain gel seal 116. This construction is somewhat preferred to that of FIGS. 1 and 2 since the channel on the outward side of the module is formed integrally with the module and the joint between channel member 26 and the inwardly stepped portions 18 of module sides 10a, 10b are now in compression. This construction is also slightly preferred since the area of the ceiling surface occupied by the module structure at 218' is reduced and the cross-sectional shape is more readily emulated with an extrusion for the formation of channel members 600 in the grid of each module in the preferred embodiment of FIG. 6.

While the invention has been described in terms of a single preferred embodiment, those skilled in the art will recognize that the invention can be practiced with modification within the spirit and scope of the appended claims. For example, inwardly stepped portions could be provided asymmetrically or only on selected sides of the plenum modules so that the downwardly facing channels would lie predominantly below a single module rather than divided below a pair of modules. While this may have some advantages in regard to maintenance, the asymmetrical construction and extended cantilever formed at the inwardly stepped portion would result in slightly reduced strength for suspension of objects such as mini-environment partitions.

Having thus described my invention, what I claim as new and desire to secure by Letters Patent is as follows:

1. A plenum module having
   at least one lateral surface having an inwardly stepped portion at a lower edge thereof, and
   a channel member located at said inwardly stepped portion and forming at least one upwardly open channel on an inward facing portion of said at least one lateral surface.

2. A plenum module as recited in claim 1, wherein said channel member is located at a lower edge of said inwardly stepped portion forms two upwardly facing channels on inward and outward facing sides of said inwardly stepped portion of said at least one lateral surface.

3. A plenum module as recited in claim 1, including at least three lateral surfaces forming a closed polygon and wherein said upwardly open channel on said inwardly facing side of said inwardly stepped portion of each of said at least three lateral surfaces forms an annular trough.

4. A plenum module as recited in claim 2, including at least three lateral surfaces forming a closed polygon and wherein said upwardly open channel on said outwardly facing side of said inwardly stepped portion of each of said at least three lateral surfaces forms an annular trough.

5. A plenum module as recited in claim 2, wherein said plenum module includes an upper surface and further including at least one conduit extending from and communicating through said upper surface to said inwardly stepped portion of said at least one lateral surface.

6. A plenum module as recited in claim 3, wherein said closed polygon is dimensioned to receive at least an air filter.

7. A plenum module as recited in claim 6, further including a gel seal material in said annular trough to form an airtight seal between said plenum module and said air filter.

8. A ceiling system including at least four modules, each said module including
   at least one lateral surface having an inwardly stepped portion at a lower edge thereof and means for attachment of said lateral surface to a lateral surface of an adjacent module, and
   a channel member located at said inwardly stepped portion and forming at least one upwardly open channels on inward facing portion of said at least one lateral surface,
   said at least four modules, when joined together by said attachment means forming a grid wherein said inwardly stepped portions of adjacent modules form downwardly facing channels.

9. A ceiling system as recited in claim 8, wherein said channel member is located at a lower edge of said inwardly stepped portions and forms two upwardly facing channels on inward and outward facing sides of said inwardly stepped portions of said at least one lateral surface.

10. A ceiling system as recited in claim 9, wherein at least one said module includes at least three lateral surfaces forming a closed polygon and wherein said upwardly open channel on said inwardly facing side of said inwardly stepped portion of each of said at least three lateral surfaces forms an annular trough.

11. A ceiling system as recited in claim 9, including at least three lateral surfaces forming a closed polygon and wherein said upwardly open channel on said outwardly facing side of said inwardly stepped portion of each of said at least three lateral surfaces forms an annular trough.

12. A ceiling system as recited in claim 9, wherein said plenum module includes an upper surface and further including at least one conduit extending from and communicating through said upper surface to said inwardly stepped portion of said at least one lateral surface.

13. A ceiling system as recited in claim 10, wherein said closed polygon is dimensioned to receive at least an air filter.

14. A ceiling system as recited in claim 13, further including a gel seal material in said annular trough to form an airtight seal between said plenum module and said air filter.

15. A ceiling system as recited in claim 9, wherein at least one said lateral portion of each of at least two of said modules include flanges at the periphery of an opening therein and forming a plenum including said at least two modules.

16. A ceiling system as recited in claim 9, further including
   a bracket including means for engaging said outwardly facing channels of two adjacent ones of said modules across said downwardly facing channel.

17. A ceiling system as recited in claim 16, further including
   means for suspending an object from said bracket at a location offset from a location centered below said downwardly facing channel.

18. A ceiling system as recited in claim 17, wherein said means for suspending an object includes a frame member.

19. A ceiling system as recited in claim 18, wherein said frame member has a lateral dimension similar to a lateral dimension of said inwardly stepped portion.

20. A ceiling system as recited in claim 17, wherein said object is a partition.

21. A ceiling system as recited in claim 19, wherein said object is a partition.

22. A ceiling system as recited in claim 8, wherein said module is a plenum module.

* * * * *